Oct. 4, 1960 J. R. WINEGARD 2,955,289

TV ANTENNA FOR COLOR RECEPTION

Filed April 15, 1957

INVENTOR.
John R. Winegard
BY Frost and Verhoeven
Attorneys

United States Patent Office 2,955,289

Patented Oct. 4, 1960

2,955,289

TV ANTENNA FOR COLOR RECEPTION

John R. Winegard, Burlington, Iowa, assignor to Winegard Company, Burlington, Iowa, a corporation of Iowa Filed Apr. 15, 1957, Ser. No. 652,746

5 Claims. (Cl. 343—815)

My invention relates to an improved antenna for the reception of color and black and white television signals in the two high frequency television bands, that is 54–88 megacycles and 174–216 megacycles.

Color television reception demands more uniform antenna response and directional characteristics than black and white reception. This is due to a number of causes, the principal cause being the presence in the color television signal of the color subcarrier removed in frequency from the amplitude modulated brightness carrier and being both amplitude and frequency modulated to combine with the brightness carrier to provide both color and brightness information from which the television image is reproduced in color. If the gain or directional characteristics of an antenna change substantially within the confines of a single six megacycle television band, it may be possible to receive black and white signals with tolerably good results, but in the case of color reception the fidelity of color reproduction may be unsatisfactory.

The antenna of Figure 1 of Winegard Patent 2,700,105, entitled TV Antenna Array, assigned to the same assignee as the present invention, does provide high gain over the 54–88 and 174–216 megacycle bands. By reason of this gain and the rather uniform directional and response characteristics of the antenna it has found wide usefulness in the reception of both black and white and color television signals. However, in marginal areas where signal strength and other conditions are adverse it has been found that the antenna of the above patent falls short of providing reception as favorable as would be desirable, particularly at the high frequency end of the 54–88 megacycle band and at the low frequency end of the 174–216 megacycle band.

In accordance with the present invention the performance of the above antenna is improved with respect to color television signals by the provision of improved reflector elements which serve to provide enhanced reflector action as the 88 megacycle frequency is approached and yet avoid the tendency of the directional characteristic to change in this region, together with auxiliary directors that serve to increase gain at the low frequency end of the 174–216 megacycle band.

It is therefore a general object of the present invention to provide an improved antenna for color television reception in the 54–88 and 174–216 megacycle bands.

Another object of the present invention is to provide an improved director system for a color television antenna of the general type discussed above in which the gain at the low frequency end of the 174–216 megacycle band is increased and made more uniform and suitable for color reception without decreasing the gain or altering the directivity pattern at the high frequency end of the 174–216 megacycle band.

Still another object of the present invention is to provide an improved reflector system for a color television reception at the 54–88 megacycle band in which effective resonant reflector action is provided over this frequency range without distortion of directional pattern near the low frequency end of the band.

Other and further objects of the present invention include the provision of a television antenna that is of simple construction, inexpensive to manufacture, reliable, light weight, presents low wind resistance and overall is suitable for use for color and black and white television reception in areas of comparatively low signal intensity.

The novel features which I believe to be characteristic of my invention are set forth with particularity in the appended claims. My invention itself, however, together with further objects and advantages thereof, will best be understood by reference to the following description taken in conjunction with the accompanying drawing in which:

Figures 1, 2, 3, 4:
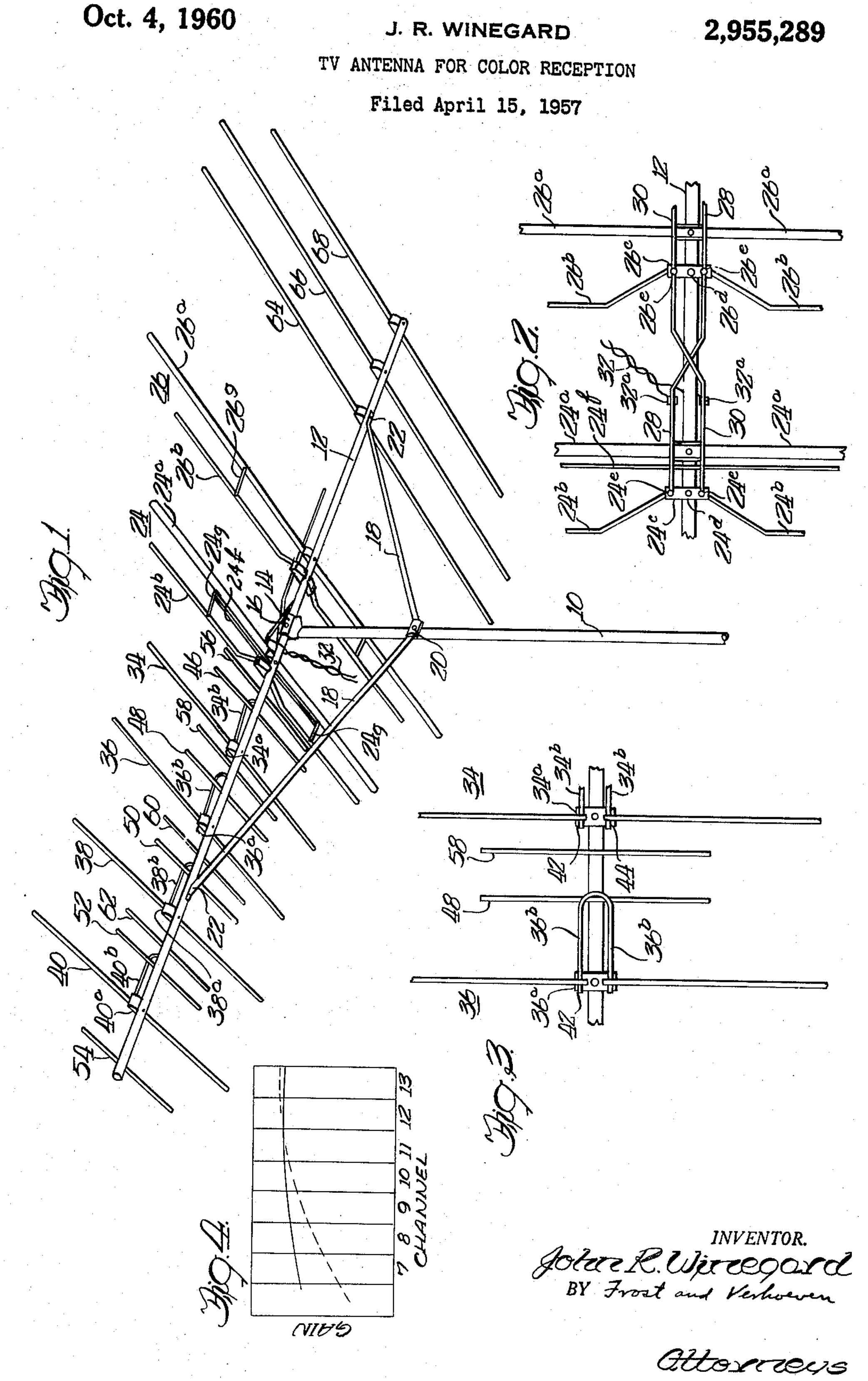
Figure 1 is a view in perspective from below of a complete antenna constructed in accordance with the present invention.
Figure 2 is a top plan view in fragmentary form of the driven elements of the antenna of Figure 1.
Figure 3 is a fragmentary top plan view showing two of the adjacent dipole directors of the antenna of Figure 1 with the pair of unitary directors disposed therebetween.
Figure 4 is a chart showing the effect on antenna gain of the auxiliary unitary directors provided in the antenna of Figure 1.

As is shown in Figure 1, the antenna of the present invention is of the same general type shown at Figure 1 of Winegard Patent 2,700,105 entitled "TV Antenna Array," assigned to the same assignee as the present invention. With specific reference to Figure 1, there is provided a mast or post 10 which is mounted on a roof or other structure (not shown) to orientate the mast in vertical position. At the top margin of the mast there is a boom 12 which is secured in a horizontal plane by the mounting bracket 14. The latter may be of any one of many constructions well known in the art, but is preferably a sheet metal saddle bent to conform to the shape of the boom 12 and to extend thereabout and having its ends cut in arcuate conformation to seat against the post or mast 10. The boom 12 is secured to the mast 10 in the saddle 14 by the mounting bolt and nut assembly indicated generally at 16. The boom 12 is held in comparatively rigid horizontal position by the struts 18, each of which is secured at one end to the mast 10 by the bolt 20 and at the opposite end to the boom 12 by bolts 22 as shown.

The antenna proper consists of a pair of aligned parallel driven elements indicated generally at 24 and 26. These are each defined by unitary rear parts **24*a* and 26*a*, respectively. These arms are cut to half wave resonance in the high frequency portion of the 54–88 megacycle band and in the low frequency portion of that band, respectively. In other words, the portion 24*a* may be approximately half wave in length at, say, television channel 5, whereas the element 26*a* may be cut to half wave length in channel, say, 2 or 3. Each of the elements 24*a* and 26*a* is connected, intermediate its length, to a dipole forward element indicated at 24*b* and 26*b*, respectively. Each of these dipole elements is somewhat shorter than the corresponding unitary element located rearwardly thereof as is shown in Figure 1. As is seen best in Figure 1, the dipole elements 24*b* and 26*b* turn rearwardly at their center sections to terminate at insulating bars 24*c* and 26*c*, respectively. Each of the insulating bars 24*c* and 26*c* is of suitable insulating material, such as molded plastic, and is preferably secured to the boom 12 by a suitable mounting bolt 24*d* and 26*d*, respectively. The dipole elements 24*b* and 26*b* are affixed to the respective insulating bars by bolts 24*e* and 26*e*, respectively, with which the dipole elements make good electrical contact. These bolts are also secured in good electrical contact relationship to the transmission line bars 28 and 30. It will be noted that these bars extend rearwardly from the bolt 24e, and adjacent the mast 10 the conductors 28 and 30 cross to reverse the phase of the element 26b in relation to elements 24b. In addition, the conductors 28 and 30 extend rearwardly of element 26c to provide desired resonant transmission line effects. The twin lead or other non-resonant transmission line to the receiver is indicated at 32 and is connected to an intermediate point on the conductors 28 and 30 as shown in Figure 2, although the exact point of connection is not critical. This connection is made by suitable attaching brackets indicated generally at 32a. In addition to the rear unitary element 24a and the forward dipole element 24b, the forward driven element has an auxiliary unitary element indicated at 24f. This element extends between the connector bars 24g** and has been found to give improved uniformity of response over the high frequency end of the low frequency television band.

A series of spaced dipole directors 34, 36, 38, and 40 are located forwardly of the forward driven element 24. Each of these dipole directors is supported from the boom 12 by an insulating block 34a, 36a, 38a, and 40a, shown in perspective in Figure 1 and in top plan view in Figure 3. Each of these dipole directors includes a pair of outwardly extending arms which are pivotally secured at their inboard ends to the corresponding insulating support block 34a to 40a, inclusive. Resilient snap members 42 are provided to snap over the edges of the blocks 34a to 40a, inclusive, to releasably secure the respective dipole arms in outwardly extending relation. In use, these dipole directors have their arms spread outwardly as shown in the figures. The pivot connections between each of the dipole arms and the respective supporting blocks are defined by conducting bolts or rivets 44 which also receive in conducting relationship the ends of the resonant coupling elements 34b, 36b, 38b, and 40b, respectively. Each of these coupling units is of length to provide a comparatively high impedance in the high frequency television band to assure that the respective dipole elements operate as separate elements in that band and do not tend to shield the other directors and the driven elements from the incoming signals in the high frequency band. These coupling units have low impedance in the low frequency band to cause the dipole directors to act as unitary elements in this band. This action is described in detail in the above-identified Winegard Patent 2,700,105.

A series of main unitary directors 46, 48, 50, 52, and 54 are located between the dipole directors, in front of the forward dipole director 40, and between the rear dipole director 34 and the forward driven element 24. Each of these directors is cut to provide director action in the high frequency television band, that is 176–216 megacycles, inclusive. They are positioned lengthwise of the boom 12 to provide a maximum degree of efficiency in increasing the gain in the high frequency band. In order to provide maximum response at the high frequency end of this band—where such response is ordinarily most difficult to attain—these directors are cut for most effective action at about 200 megacycles. Rearwardly of each of the unitary directors 46, 48, 50, and 52 there is located an auxiliary unitary director 56, 58, 60, and 62, respectively. Each of these unitary directors is cut to about the same length as the main unitary directors. As is described in detail hereafter, these auxiliary directors serve to flatten the response curve in the high frequency television band to maintain a more uniform response throughout that band.

Rearwardly of the rear driven element 26 there are provided a series of reflectors 64, 66, and 68. The first two of these reflectors, 64 and 66, are cut to provide effective reflector action at the low frequency end of the low frequency band, say channel 2, and are so positioned as to cooperate with the driven elements 24 and 26 in reflector action at the low end of the low frequency band. The rear reflector 68 is of length to serve effectively as a reflector in the higher frequency or mid-frequency end of the low frequency band, as is described in further detail hereafter. Specifically, this reflector is cut for reflector operation in, say, channel 4, and as shown, is located rearwardly of the other two reflectors.

In a practical television antenna which has proved to be specially effective for colored television reception, the following dimensions were used:

| | Inches |
|---|---|
| Length of director **54** | 23 |
| Length of dipole director **40** | 52½ |
| Length of director **52** | 23 |
| Length of director **62** | 23 |
| Length of dipole **38** | 52½ |
| Length of director **50** | 23 |
| Length of director **60** | 23 |
| Length of dipole director **36** | 52½ |
| Length of director **48** | 24 |
| Length of director **58** | 24 |
| Length of dipole director **34** | 52½ |
| Length of director **46** | 26½ |
| Length of director **56** | 26½ |
| Length of dipole arms **24b** | 32½ |
| Length of connectors **24g** | 4⅞ |
| Length of unitary arm **24a** | 70 |
| Length of dipole arms **26b** | 38 |
| Length of connectors **26g** | 4⅞ |
| Length of arms **26a** | 99 |
| Length of reflector **64** | 110 |
| Length of reflector **68** | 110 |
| Length of reflector **68** | 96 |
| Distance between director **54** and dipole director **40** | 8¼ |
| Distance between dipole director **40** and director **52** | 5¼ |
| Distance between directors **52** and **62** | 3 |
| Distance between director **62** and dipole director **38** | 5 |
| Distance between dipole director **38** and director **50** | 5 |
| Distance between director **50** and director **60** | 3 |
| Distance between director **60** and dipole director **36** | 5 |
| Distance between dipole director **36** and director **48** | 4¾ |
| Distance between director **48** and director **58** | 3½ |
| Distance between director **58** and dipole director **34** | 3 |
| Distance between dipole director **34** and director **46** | 5¾ |
| Distance between director **46** and director **56** | 3½ |
| Distance between director **56** and the parallel portion of dipole arms **24b** | 2⅜ |
| Distance between the arms **24a** and the parallel portion of dipole arms **26b** | 12⅝ |
| Distance between the arms **26a** and reflector **64** | 23⅞ |
| Distance between reflector **64** and **66** | 9 |
| Distance between reflector **66** and reflector **68** | 9 |
| Length of couplers **34b** to **40b**, inclusive (tuned to provide maximum impedance while in the assembly at about 195 megacycles) | 18½ |

All of the above distances are measured from the center of diameter of one element to the center of diameter of the following element.

*Practical operation*

In operation, the above described antenna serves to receive signals in the 54–88 megacycles band through the action of the dipole directors 34–40 acting as unitary director elements. That is, within this frequency range the impedance of couplers 34b–40b inclusive, is so low that they merely contribute some inductance load to these directors and thus somewhat shorten the required director length. The short unitary directors 46 to 54 and 56 to 62 do not greatly influence operation of the antenna in this frequency range.

With respect to signals at the low frequency end of this band, namely signals near 54 megacycles, the reflectors 64 and 66 serve to increase the antenna gain somewhat and also assure a reasonable degree of directivity. This is because these reflectors are of length slightly greater than the resonant length of about 54 megacycles and accordingly act as resonant reflectors near this frequency.

However, as the high frequency end of the 54–88 megacycle band is approached, the reflectors 64 and 66 depart from the length giving rise to best resonant reflector action. They thus become relatively less effective in increasing gain and providing good directivity. However, as the 88 megacycle frequency is approached, the reflector 68 becomes increasingly effective so that as the influence of reflectors 64 and 66 decreases the influence of reflector 68 increases and the overall gain in directivity of the antenna tends to remain the same.

However, the reflector 68 tends to operate as a director in the low frequency end of the 54–88 megacycle band. Thus with signals approaching the antenna from the rear and of frequency near the low end of this band the reflector 68 acts as a director and thereby tends to destroy the directional characteristics of the antenna by working against the action of reflectors 64 and 66. It has been found that by the use of the dual reflectors 64 and 66 tuned to the low frequency end of the band, that this reversal of directivity is essentially overcome and the antenna operates free from the changes in directivity pattern otherwise created by the reflector 68. With only one reflector 64—66 it has been found that the action of director 68 in altering the directivity pattern at some frequencies is highly undesirable.

In the 174–216 megacycle band the impedance of the couplers **34*b* to 40*b*, respectively, is very high. At this time the dipole directors 34–40 each tends to act as a pair of axially spaced unitary directors. They accordingly do not tend to shield the driven elements on the other directors and moreover contribute some to the gain of the antenna. In this frequency range the directors 46—48—50—52—54 serve by director action to increase the gain of the antenna. However, since these directors are preferably cut to operate best close to 217 megacycles the influence of these directors is somewhat lessened as the 174 megacycle end of this band is approached. The consequence is that the action of the directors 46—48—50—52—54 and 34–40 is to give a gain characteristic that droops somewhat as 174 megacycle frequency is approached. This effect is shown by the dashed curve in the chart of Figure 4. For black and white television reception this variation of gain is not unduly critical and accordingly does not adversely influence reception. With color television signals close to the 174** megacycles however, the gain variances may be sufficient to affect adversely the picture quality, especially at comparatively low signal levels.

The supplementary unitary directors 56—58—60—62 inclusive, are disposed at the rear of each of the directors 46—48—50—52—54 and have been found to increase substantially the gain at the low frequency end of the 174–217 megacycle band. This gain is believed to be due to a tendency on the part of the supplementary directors to provide action somewhat similar to that achieved by "broad banding" the directors 46—48—50—52 by constructions increasing effective shunt capacity. It is not entirely certain that this accounts for the improvement, but tests show that the gain does change as indicated in Figure 4 and that the performance of the antenna on color television is considerably enhanced by the addition of the auxiliary directors, particularly at the low end of the high band.

It should be noted that the supplementary directors 56 to 62 could be cut to somewhat increased length and thereby provide effective action as directors towards the low frequency end of the high frequency band. By such an arrangement, the gain of the antenna can, in fact, be considerably increased towards 174 megacycles. However, in so doing the gain at the high frequency end of the band is reduced because as the high frequency end is approached these directors tend to act as reflectors, and thereby tend to degrade the response of the antenna as well as to distort the directivity pattern. While efforts have been made to use combinations of comparatively short and comparatively long directors to achieve "stagger tuning" effects, the results have been disappointing because at the high frequencies the response is reduced for this reason. In the antenna of the present invention this teaching of the prior art is discarded, and no effort is made to design the directors 56–62 for effective director action at the low frequency end of the high frequency band. On the contrary the opposite action is desired—and they are tuned to the high frequency end of the high band. Yet, it has been found that their overall effect of the supplementary directors is to increase the gain of the antenna at lower frequencies, even though they do not greatly alter the operation at the higher frequencies.

While I have shown and described a specific embodiment of the present invention it will, of course, be understood that numerous variations and alternative constructions may be utilized without departing from the true spirit and scope thereof. In particular it is possible within the teachings of the present invention to vary the specific lengths, positions, number and configurations of the parts. I therefore intend by the appended claims to cover all such modifications and alternative constructions as fall within the true spirit and scope of the invention.

What I claim as new and desire to secure by Letters Patent of the United States is:

1. An antenna for TV reception on two spaced frequency bands of the kind having at least one driven element, at least one dipole director located forwardly of the driven element and having a coupling having high impedance in the high frequency band and low impedance in the low frequency band, the dipole director serving as two unitary elements in the high frequency band and a single director element in the low frequency band, the improvement comprising: a first unitary director element interposed substantially midway between the dipole director and the driven element, said director element being slightly less than one half wave in electrical length at the high frequency end of the high frequency band; to provide increased gain at the high frequency end of the high frequency band, and a second unitary director of substantially the same length as the first unitary director interposed between the first unitary director and the driven element, said unitary directors being spaced by a distance less than one fifth of their length, whereby at the low frequency end of the high frequency band the two directors operate off their individual most effective frequencies in coaction to provide effective overall director action on all frequencies in the high frequency band.

2. In an antenna for TV reception on two spaced frequency bands of the kind having a driven element, a plurality of dipole directors located in spaced relation forwardly of the driven element, couplings connecting the inboard ends of the respective dipole directors to cause the same to serve as two unitary elements in the high frequency band and as one director element in the low frequency band, the improvement comprising: a series of first unitary directors interposed respectively substantially midway between each pair of dipole directors and between the last dipole director and the driven element, each said director element being slightly less than one half wave in length at the high frequency end of the high frequency band to provide increased gain at the high frequency end of the high frequency band; and auxiliary unitary directors disposed rearwardly of at least two of said first unitary directors, respectively, at a distance less than one fifth of the length of the respective first unitary directors and having substantially the same length as the respective unitary directors, whereby at the low frequency end of the high frequency band the pairs of adjacent unitary directors operate off the most effective individual director frequencies in coaction to provide effective overall director action.

3. An antenna particularly suitable for TV reception over a wide frequency band, comprising in combination: a driven element responsive to signals in said band; a first reflector slightly greater than one half wave in electrical length at a predetermined frequency in said band and positioned behind the driven element to produce effective reflector action at said frequency; a second reflector element slightly greater than one half wave in electrical length at a substantially higher frequency within said band and located behind the first reflector and driven element to provide effective reflector action at said higher frequency, said higher frequency being sufficiently removed from said predetermined frequency to give rise to director action by said second reflector within said band; and a third reflector interposed between the first and second reflectors and of length substantially the same as said first reflector to reduce the loss of directivity at frequencies intermediate said predetermined frequency and said higher frequency.

4. An antenna for TV reception over the 54–88 megacycle band and the 174–216 megacycle band, comprising in combination: a driven element; a plurality of dipole directors located in spaced relation forwardly of the driven element; resonant couplings connecting the inboard ends of the respective dipole directors to cause the same to serve as two unitary director elements in the high frequency band and as one director element in the low frequency band; a series of first unitary directors interposed, respectively, substantially midway between each of dipole directors and between the last dipole director and the driven element and of slightly less than one half wave in electrical length at about 216 megacycles to provide increased gain at the high frequency end of the high 174–216 megacycle band; a series of auxiliary unitary directors located rearwardly of the respective unitary directors, having substantially the same length, and being spaced by a distance less than one fifth of the length of the respective unitary director, whereby at the low frequency end of the 174–216 megacycle band the pairs of adjacent unitary directors operate off their most effective individual director frequencies in coaction to provide effective overall director action; a first reflector located behind the driven element and of slightly greater than one half wave of electrical length at the low end of the 54–88 megacycle band; a second reflector located behind the first reflector and of slightly greater than one half wave of electrical length at a higher frequency in the 54–88 megacycle band to operate as a reflector at such higher frequency and as a director at an intermediate frequency in said band; and a third reflector of substantially the length of the first reflector interposed between the first and second reflectors to reduce the loss of directivity at frequencies intermediate the most effective frequency of the first and second reflectors.

5. An antenna for TV reception over two spaced frequency bands comprising in combination: a driven element; a plurality of dipole directors located in spaced relation forwardly of the driven element; couplings connecting the inboard ends of the respective dipole directors to cause the same to serve as unitary directors in the high frequency band and as one director element in the low frequency band; a series of first unitary directors interposed, respectively, substantially midway between each pair of dipole directors and between the last dipole director and the driven element and slightly less than one half wave in electrical length at the high frequency end of the high frequency band to provide increased gain at the high frequency end of the high frequency band; a series of auxiliary unitary directors for said first unitary directors, respectively, each spaced from the respective first unitary director by less than one fifth the length thereof and of substantially the same length as the respective first unitary director, whereby at the low frequency end of the high frequency band the pairs of adjacent unitary directors operate off their most effective individual director frequencies in coaction to provide effective overall director action.

References Cited in the file of this patent

UNITED STATES PATENTS

| | | |
|---|---|---|
| 2,644,091 | Middlemark | June 30, 1953 |
| 2,700,105 | Winegard | Jan. 18, 1955 |
| 2,772,413 | Guernsey | Nov. 27, 1956 |

OTHER REFERENCES

The A. R. R. L. Antenna Book, copyright 1956, pp. 161–163.